United States Patent
Narita et al.

[11] Patent Number: 5,990,593
[45] Date of Patent: Nov. 23, 1999

[54] PERMANENT MAGNET ROTOR TYPE ELECTRIC MOTOR

[75] Inventors: Kenji Narita; Takashi Suzuki; Hiroyuki Okudera; Yuji Kawai; Yuji Souma; Koji Kawanishi; Yoshichika Fukuda, all of Kawasaki, Japan

[73] Assignee: Fujitsu General Limited, Kawasaki, Japan

[21] Appl. No.: 09/179,593

[22] Filed: Oct. 27, 1998

[30] Foreign Application Priority Data

Oct. 29, 1997 [JP] Japan .................................. 9-312604
Oct. 16, 1998 [JP] Japan .................................. 10-295191

[51] Int. Cl.⁶ .................................................. H02K 21/12
[52] U.S. Cl. .......................... 310/156; 310/261; 310/193; 310/114; 310/112
[58] Field of Search .................................. 310/156, 261, 310/193, 114, 112, 162

[56] References Cited

U.S. PATENT DOCUMENTS

| | | | |
|---|---|---|---|
| 4,795,936 | 1/1989 | Crosetto et al. | 310/156 |
| 4,916,346 | 4/1990 | Kliman | 310/216 |
| 5,182,483 | 1/1993 | Hibino et al. | 310/211 |
| 5,369,325 | 11/1994 | Nagate et al. | 310/156 |
| 5,378,953 | 1/1995 | Uchida et al. | 310/156 |
| 5,508,576 | 4/1996 | Nagate et al. | 310/156 |
| 5,666,015 | 9/1997 | Uchibori et al. | 310/261 |
| 5,679,995 | 10/1997 | Nagate et al. | 310/156 |
| 5,841,212 | 11/1998 | Mita et al. | 310/156 |
| 5,844,344 | 12/1998 | Uetake et al. | 310/156 |

*Primary Examiner*—Nestor Ramirez
*Assistant Examiner*—Saeed Ghahramani
*Attorney, Agent, or Firm*—Kanesaka & Takeuchi

[57] ABSTRACT

A permanent magnet rotor type electric motor is formed of a stator core generating a rotation magnetic field, and a rotor core rotationally situated inside the stator core. The rotor core includes a first core member for generating a magnet torque, permanent magnets embedded in the first core member for forming magnetic poles, and a second core member for generating a reluctance torque without having a permanent magnet therein. The second core member is coaxially united with the first core member so that the rotor core is divided into the first core member for generating the magnet torque and the second core member for generating the reluctance torque.

18 Claims, 16 Drawing Sheets

PERMANENT MAGNET ROTOR TYPE ELECTRIC MOTOR

BACKGROUND OF THE INVENTION

1. Field of the Invention

This invention relates to an electric motor having a permanent magnet in a rotor core, such as Brushless DC motor or the like and, more specifically, to a permanent magnet rotor type electric motor in which a reluctance torque is utilized to improve efficiency thereof.

2. Description of the Related Art

In an electric motor such as Brushless DC motor, permanent magnets are embedded in a core of an inner rotor thereof, of which conventional examples are shown in FIG. 23 and FIG. 24. Incidentally, each drawing is a plane view of the inside of the electric motor shown from a plane perpendicular to the rotation axis thereof.

In the conventional example shown in FIG. 23, a rotor core 2 is disposed in a stator core 1 having, for example, 24 slots in which a field magnet rotates. The number of poles of the above electric motor is four, so that four permanent magnets 3 are arranged in the rotor core in accordance with the number of poles.

Each permanent magnet 3 is formed into a band plate shape of rectangular cross-section, and each pair of permanent magnets 3 as the south poles and the north poles is arranged across from each other along a direction perpendicular to a diameter line of the rotor core 2 on the outer circumference side of the rotor core 2. Each permanent magnet 3 is embedded in the rotor core 2 in a direction orthogonal to paper drawn with FIG. 23.

Between the two permanent magnets 3, a hole 4 as flux barrier is formed for avoiding short-circuiting and leaking the magnetic flux occurring between the adjacent permanent magnets. In this case, the hole 4 is represented as a triangle-shaped hole and located at each end of each permanent magnet 3. In the central portion of the rotor core 2, a center hole 5 is opened to pass a rotation shaft (not shown) therethrough.

In this point, when the magnetic flux distribution in a gap portion (between teeth of the stator core 1 and the permanent magnets 3) caused by each permanent magnet 3 is in a sine wave state, torque T of the electric motor is given as $T = Pn\{\Phi a \cdot Ia \cdot \cos \beta - 0.5(Ld-Lq) \cdot Ia^2 \cdot \sin 2\beta\}$.

It should be mentioned that $\Phi a$ is an armature flux-linkage caused by the permanent magnet 3 on the d and q coordinate axes, Ld and Lq are the d-axis inductance and the q-axis inductance respectively, Ia is amplitude of an armature current on the d and q coordinate axes, $\beta$ is a lead angle of the armature current from the q axis on the d and q coordinate axes, and Pn is a pole-logarithm.

In the above expression, the first term expresses a magnet torque generated by the permanent magnets 3 and the second term expresses a reluctance torque generated by the difference between the d-axis inductance and the q-axis inductance. Refer to a treatise published in T. IEE Japan, vol. 117-D, No. 8. 1997 for further detail.

In the rotor core 2 shown in FIG. 24 as another conventional example, a permanent magnet 6 of arc-shaped cross-section is used, of which torque T is also given by the aforementioned expression.

However, in the conventional examples, the permanent magnet 3 or 6 having low magnetic permeability is arranged on a magnetic circuit of the d-axis and nearly perpendicular thereto, therefore the inductance Ld on the d-axis is originally small. On the other hand, the comparatively large permanent magnet 3 or 6 is embedded in and along a magnetic circuit of the q-axis, therefore, the inductance Lq on the q-axis is larger than the inductance Ld on the d-axis, but the inductance Lq on the q-axis is not very different from the inductance Ld on the d-axis.

As described thus far, there are disadvantages that the value of the difference between inductances (Ld–Lq) as the parameter in the aforementioned mathematical expression for calculating a torque is small, and the reluctance torque is small.

SUMMARY OF THE INVENTION

To solve the aforementioned disadvantages, an object of the present invention is to provide a permanent magnet rotor type electric motor capable of increasing a reluctance torque by controlling the inductance Ld on the d-axis in a small value while increasing the inductance Lq on the q-axis.

According to the present invention, the object is attained by applying, using a specific rotor core in a permanent magnet rotor type electric motor in which a rotor core having magnetic poles, each being formed of a permanent magnet disposed inside a stator core generating a rotation magnetic field. The specific rotor core in includes a first core member for generating a magnet torque in which a permanent magnet is embedded as each magnetic pole and a second core member for generating a reluctance torque not having a permanent magnet which are coaxially united.

As described above, the rotor core is divided into a member for generating a magnet torque and a member for generating a reluctance torque, thereby, in proportion to the dividing ratio, the difference of the inductances (Ld–Lq) can be determined in any large values in the aforementioned expression calculating for a torque.

In the present invention, a permanent magnet having predetermined cross-section shape in each magnetic pole is embedded in the first core member, and a slit is formed along a magnetic circuit of the magnetic flux from the stator core at a position corresponding to each permanent magnet in the second core member, by which the inductance Lq on the q-axis is increased.

In this case, the slit in the second core member is preferably arranged, seen from the first core member, within a shadow or projection area of cross-section shape of the permanent magnet embedded in the first core member. With this arrangement, the slit acts as a flux barrier for preventing short-circuiting and leaking of the magnetic flux on the contacting surface between the first core member and the second core member.

Some formations described hereinafter are included in the scope of the present invention, with which the same effects as above are produced.

As the first formation, in the first core member, the permanent magnet is formed to have fan-shaped cross-section and placed to orient its long arc side along the outer circumference of the first core member. In the second core member, the slit is formed in an arc shape along the magnetic circuit of the magnetic flux from the stator core within the shadow area of fan-shaped cross-section of the above permanent magnet. As described above, a large permanent magnet of fan-shaped cross-section is applied as the permanent magnet, thereby the magnet torque can be increased in proportion with the size.

As the second formation, in the first core member, the permanent magnet is formed to have fan-shaped cross-section, similar to the first formation and placed to orient its long arc side along the outer circumference of the first core member. In the second core member, a plurality of slits, for example two slits, each of which is formed into an arc shape, is provided along the magnetic circuit of the magnetic flux from the stator core within the shadow area of fan-shaped cross-section of the above permanent magnet.

As the third formation, in the first core member, the permanent magnet is formed to have trapezoid cross-section and placed to orient its long side along the outer circumference of the first core member. In the second core member, the slit is formed into an arc shape along the magnetic circuit of the magnetic flux from the stator core within the shadow area of trapezoid cross-section of the above permanent magnet. In this formation, the permanent magnet is large similar to the first formation, thereby the magnet torque can be increased.

As the fourth formation, in the first core member, the permanent magnet is formed to have trapezoid cross-section similar to the third formation and placed to orient its long side along the outer circumference of the first core member. In the second core member, a plurality of slits each of which is formed into an arc shape along the magnetic circuit of the magnetic flux from the stator core is provided, and at least one of slits is placed to be entirely included within the shadow area of trapezoid cross-section of the above permanent magnet.

As the fifth formation, in the first core member, the permanent magnet is divided into two magnet pieces of rectangular cross-section, and each being placed parallel to the magnetic-pole boundary line. In the second core member, two slits each of which is formed into an arc shape are provided along the magnetic circuit of the magnetic flux from the stator core within each shadow area of rectangular cross-section of the above two magnet pieces.

As the sixth formation, in the first core member, the permanent magnet is divided into two magnet pieces similar to the fifth formation and each being placed parallel to the magnetic-pole boundary line. In the second core member, two first slits each of which is formed into an arc shape along the magnetic circuit of the magnetic flux from the stator core within each shadow area of rectangular cross-section shape of the above two magnet pieces and a second slit which is formed into an arc shape along the magnetic circuit of the magnetic flux from the stator core spreading over the shadow areas of the above two magnet pieces are provided.

As the seventh formation, in the first core member, the permanent magnet is divided into two magnet pieces of rectangular cross-section, and the two magnet pieces are placed at an angle to decrease in space toward the ends of the two magnet pieces which are oriented toward the center of the first core member. In the second core member, two slits each of which is formed into an arc shape are provided along the magnetic circuit of the magnetic flux from the stator core within each shadow area of rectangular cross-section shape of the above two magnet pieces.

As the eighth formation, in the first core member, similar to the seventh formation, the permanent magnet is divided into two magnet pieces of rectangular cross-section, and the two magnet pieces are placed at an angle to decrease in space toward the ends of the two magnet pieces which are oriented toward the center of the first core member. In the second core member two first slits each of which is formed into an arc shape along the magnetic circuit of the magnetic flux from the stator core within each shadow area of rectangular cross-section shape of the above two magnet pieces, and a second slit which is formed into an arc shape along the magnetic circuit of the magnetic flux from the stator core at an area except each shadow area of the above two magnet pieces, are provided.

As the ninth formation, in the first core member, the permanent magnet which is formed into a plate-shape of rectangular cross-section and polarized in a direction of the plate-thickness is placed to position the center line of the plate-thickness on the magnetic-pole boundary line, and one portion thereof is used as one magnetic pole of the adjacent magnetic poles and the other portion thereof is used as the other magnetic pole of the adjacent magnetic poles. In the second core member two slits each of which is formed into an arc shape along the magnetic circuit of the magnetic flux from the stator core within the shadow area of each magnetic pole of the above permanent magnet, are provided.

As the tenth formation, the first core member is the same as that in the ninth formation. In the second core member, similar to the ninth formation, two first slits each of which is formed into an arc shape along the magnetic circuit of the magnetic flux from the stator core within the shadow area of each magnetic pole of the above permanent magnet, are provided. In this formation a second slit which is formed into an arc shape along the magnetic circuit of the magnetic flux from the stator core at an area except shadow areas of the permanent magnets in the first core member, is provided.

As the eleventh formation, in the first core member, the permanent magnet is formed to have rectangular cross-section and placed to orient its convexity along the outer circumference of the first core member. In the second core member, the slit is formed into an arc shape along the magnetic circuit of the magnetic flux from the stator core within the shadow area of arc-shaped cross-section of the above permanent magnet.

As the twelfth formation, in the first core member, the permanent magnet is formed to have arc-shaped cross-section and placed to orient the convexity toward the center of the first core member. In the second core member, the slit is formed into an arc shape along the magnetic circuit of the magnetic flux from the stator core within the shadow area of arc-shaped cross-section of the above permanent magnet.

As the thirteenth formation, in the first core member, similar to the twelfth formation, the permanent magnet is formed to have arc-shaped cross-section and placed to orient its convexity toward the center of the first core member. In the second core member a plurality of slits, for example two slits, each of which is formed into an arc shape along the magnetic circuit of the magnetic flux from the stator core within the shadow area of arc-shaped cross-section of the above permanent magnet, are provided.

In any formations described above, the permanent magnet in the first core member is preferably made of a ferrite magnet which is less expensive and easily available.

In the present invention, both the first core member and the second core member are composed of the laminated bodies of magnetic steel plates which are stamped out by pressing, and the hole for embedding the permanent magnet is preferably stamped out in each magnetic steel plate for the first core member and each slit is preferably stamped out within the shadow area of the hole for embedding the permanent magnet in each magnetic steel plate for the second core member.

In other words, it is preferable that the slit in the second core member is placed within the shadow area of the hole for embedding the permanent magnet in the first core member, and the slit in the second core member is smaller in dimension than the hole for embedding the permanent magnet in the first core member.

Thus, in fabricating the rotor core, at the outset, the slit for the second core member is stamped out on all core materials (magnetic steel plates) used for fabricating the rotor core. After that, the hole for embedding the permanent magnet for the first core member is stamped out on a proportion of all the core materials, which is required for forming the first core member, to replace the hole for embedding of the permanent magnet which has been stamped out for the second core member at the first step. In this manner, production cost is not much increased, and the core laminated body made of the magnetic steel plate can be obtained efficiently.

Note that, thereafter, the permanent magnet material is embedded in the core-laminated body and polarized, but if necessary, the permanent magnet material is embedded in the core-laminated body after being polarized.

The present invention is appropriate for Brushless DC motor used for driving a compressor of an air conditioner, in which the performance of the air conditioner can be increased.

BRIEF DESCRIPTION OF THE DRAWINGS

The present invention will be described further hereinafter, by way of example only, with reference to the accompanying drawings in which.

DETAILED DESCRIPTION OF PREFERRED EMBODIMENT(S)

The first embodiment of a permanent magnet rotor type electric motor according to the present invention will be described below with reference to FIG. 1 to FIG. 4. The permanent magnet rotor type electric motor is composed of a stator core 16 generating a rotation magnetic field, and a rotor core 10 which is rotatably provided in the state core 16.

In the embodiment, the stator core 16 has 24 slots and is provided with armature winding in three phases (U-phase, V-phase and W-phase). In this point, the armature winding positioned on the outer circle side is the U phase, the armature winding positioned on the inner circle side is the W phase, and the armature winding between the U and W phases is the V phase. The number of slots and the form of the armature winding can be selectively decided.

Figure 2:
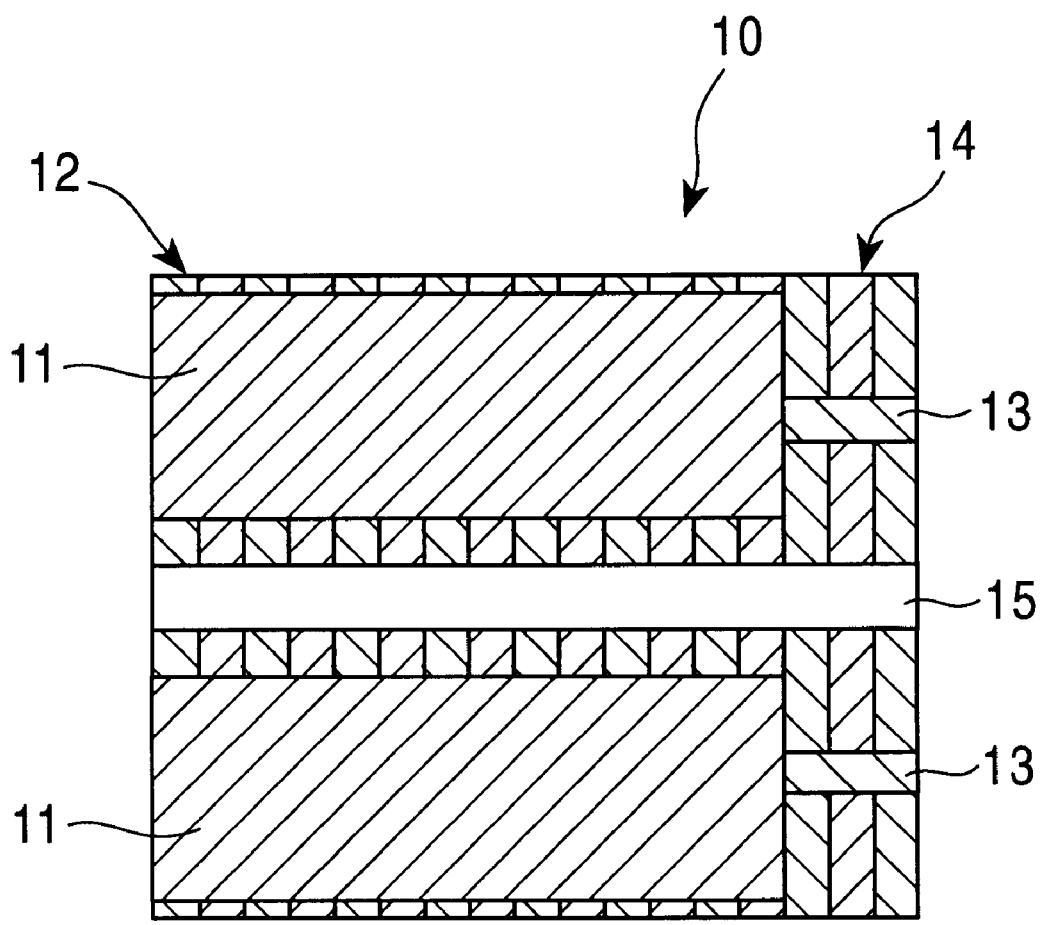
FIG. 2 is a sectional view taken along the d-axis of a rotor core in the first embodiment.

As shown in a sectional view of FIG. 2, the rotor core 10 is constructed by coaxially uniting a first core member 12 to a second core member 14. At the rotative center of the rotor core 10, a center hole 15 for passing a rotating shaft (not shown) is opened.

Figure 3:
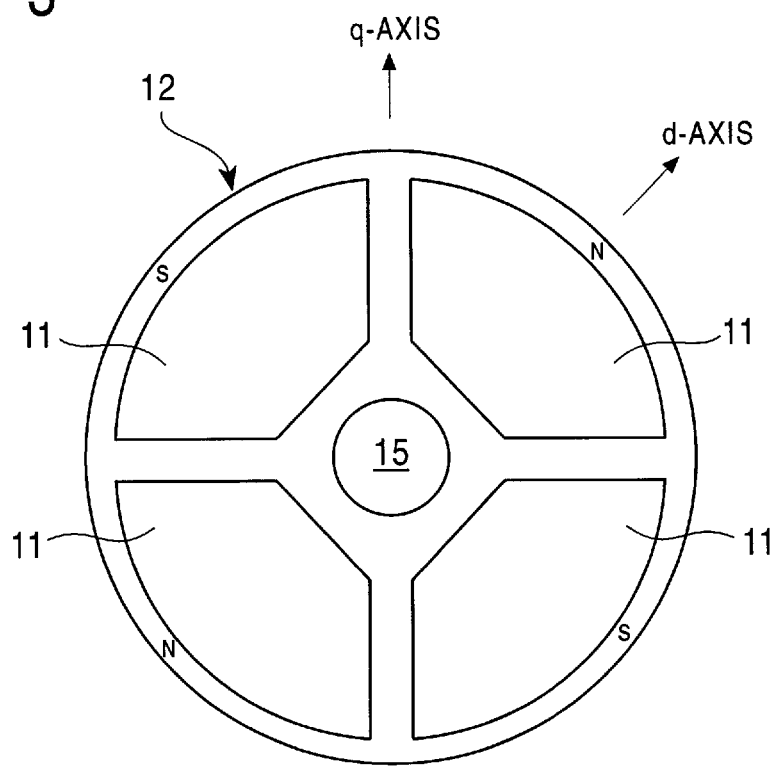
FIG. 3 is a plan view of a first core member constituting the rotor core in the first embodiment.

The first core member 12 is for generating a magnet torque and a permanent magnet 11 is embedded in the first core member 12 as shown in FIG. 3. In this embodiment, a ferrite magnet having fan-shaped cross-section is used for the permanent magnet 11.

The number of magnetic poles of the permanent magnet rotor type electric motor in this embodiment is four, so that four permanent magnets 11 are placed to orient each long arc side thereof toward the outer circumference of the core at regular spaced intervals in a circumferential direction.

Figure 4:
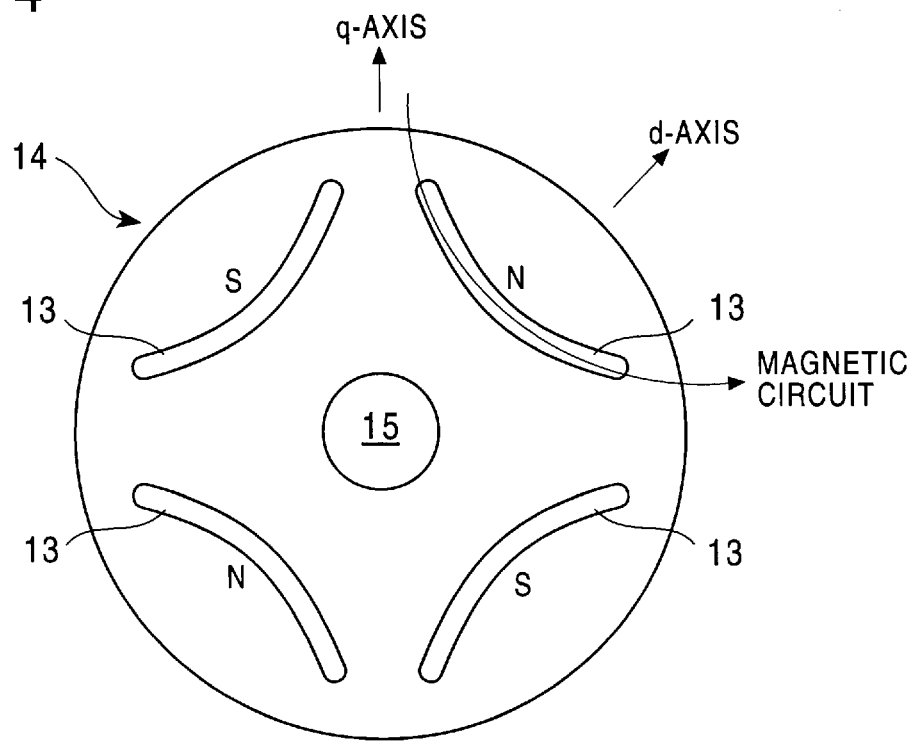
FIG. 4 is a plan view of a second core member constituting the rotor core in the first embodiment.

The second core member 14 is for generating a reluctance torque and is not provided with a permanent magnet. More specifically, in the second core member 14, four slits 13 are only formed, in accordance with the number of magnetic poles (four poles) of the permanent magnet rotor type electric motor, at regular spaced intervals in a circumferential direction as shown in FIG. 4.

Each slit 13 is formed into an arc shape along a magnetic circuit of the magnetic flux from the stator core 16. More specifically, each slit 13 is placed to orient its convexity toward the center hole 15 of the core, and each slit 13 is formed into an inverted-arc shape seen from the center hole 15.

Each slit 13 is positioned in one-to-one correspondence with each permanent magnet 11 in the first core member 12, and when the first core member 12 is coaxially united to the second core member 14, the slit 13 in size does not exceed a shadow or projection area of the permanent magnet 11.

Figure 1:
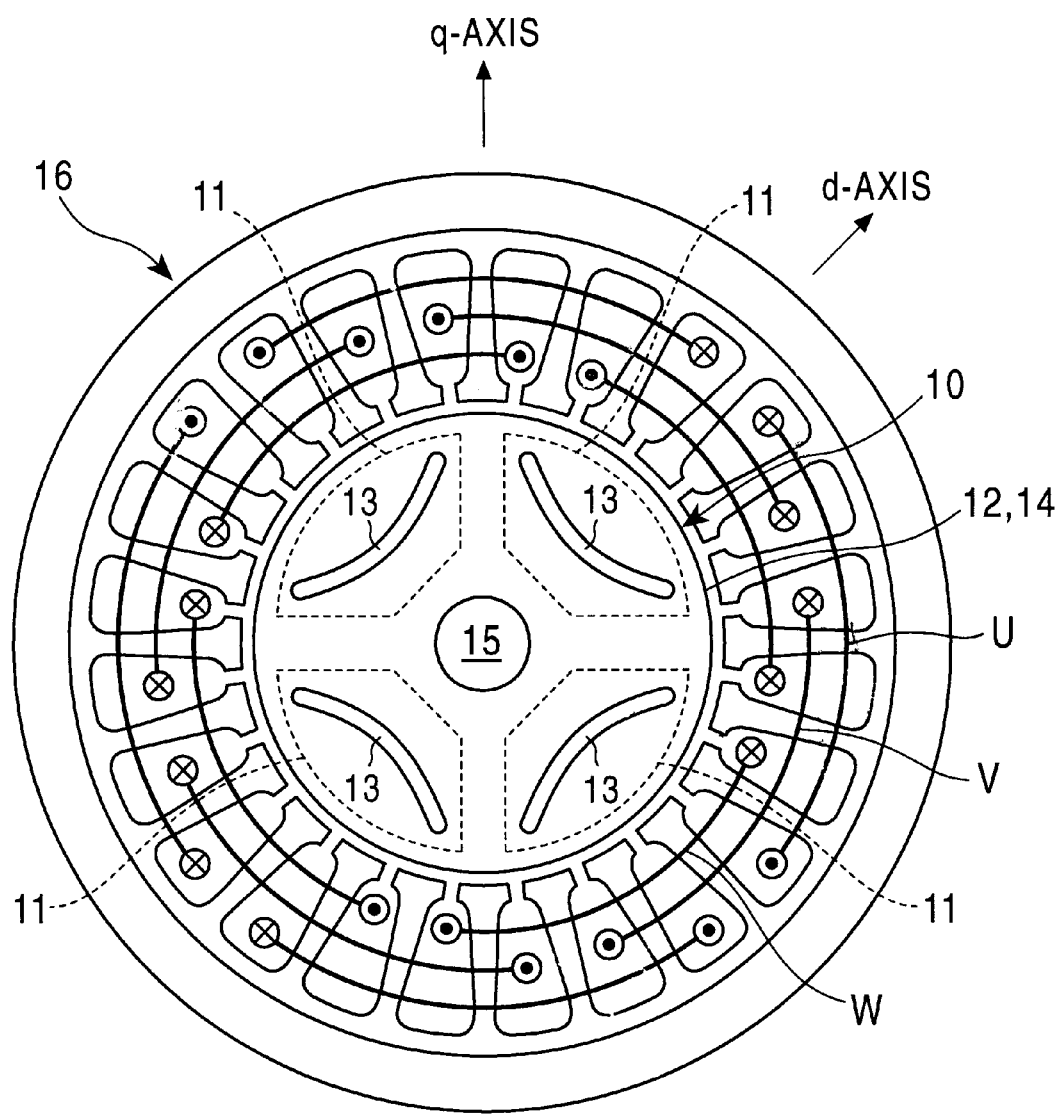
FIG. 1 is a diagrammatic plan view showing the first embodiment according to the present invention.

FIG. 1 is a plan view of the rotor core 10 seen from the second core member 14, therefore the permanent magnet 11 is shown with a broken line and the slit 13 is shown with a solid line inside the broken line. It will be easily understood that the slit 13 is arranged within the shadow or projection are projecting the permanent magnet 11 onto the second core member 14. The broken line for the permanent magnet shows the shadow or projection area.

Incidentally, where the rotor core 10 comprises the first core member 12 for generating a magnet torque and the second core member 14 for generating a reluctance torque, the first core member 12 preferably occupies more than half of the whole shaft length of the rotor core 10 as this embodiment.

According to this rotor core 10, in the first core member 12, each permanent magnet 11 is formed to have fan-shaped cross-section and the most of the first core member 12 is occupied with the permanent magnet 11, therefore the magnet torque can be increased up to the maximum.

On the other hand, in the second core member 14, a magnet torque is not generated for the absence of a permanent magnet but the magnetic resistance in the magnetic circuit of the magnetic flux from the stator core 16 is small due to the slit 13, which means the inductance Lq on the q-axis is increased.

Accordingly, the difference of the inductances between the d-axis and the q-axis (Ld–Lq) is large, therefore the reluctance torque can be increased. Since the slit 13 in the second core member 14 is contained in the cross-section shape of the permanent magnet 11 in the first core member 12, on the contacting surface between the first core member 12 and the second core member 14, the slit 13 exhibits the function of flux barrier, thereby avoiding short-circuiting and leaking of the magnetic flux of the permanent magnet 11.

As described above, the magnet torque is mainly generated in the first core member 12 and the reluctance torque is generated in the second core member 14, thereby the size of the permanent magnet 11 can be determined to make the magnet torque as large as possible in the first core member 12 without considering the reluctance torque.

In the second core member 14, separating from the first core member 12, the length and the width of the slit 13 can be independently determined to make the reluctance torque the maximum and to exhibit the function of flux barrier at its maximum, therefore obtaining a motor with high efficiency.

Furthermore, a component ratio between the first core member 12 and the second core member 14 in the rotor core 10 is suitably selected, thereby attaining the required magnet torque and reluctance torque.

In fabricating the rotor core 10, a mechanical core laminating method is used, in which a core material is stamped out from a magnetic steel plate by a core press die with an automatic press machine, and the core materials are laminated in a predetermined number in the die and then riveted together.

In the press process, the core materials for the first core member 12 and the core materials for the second core member 14 may be separately stamped out in the predetermined number in advance, but in the present invention, the core materials all required for assembling the rotor core 10 are stamped out as the second core member 14 at the start. In this point, the slit 13 is formed in all of the core materials. After that, the number of core materials required for the first core member 12 is separated from all of the core materials, and the holes for embedding the first permanent magnet 11 are formed in the separated core materials.

In this case, the embedding hole for the permanent magnet 11 is stamped out to replace the slit 13 which is previously formed for the second core member 14, therefore only the embedding hole for the first permanent magnet 11 is formed in the core material for the first core member 12.

As described thus far, after the first core member 12 and the second core member 14 are unitedly assembled, the ferrite magnet material as the first permanent magnet 11 is embedded and polarized in the first core member 12, thereby obtaining the rotor core 10.

Incidentally, after a permanent magnet material is polarized to make the permanent magnet 11, which can be embedded in the core.

According to the present invention, by using already-existing machine without new facilities, the rotor core 10 can be fabricated, resulting in no increment of production cost.

Moreover, by applying the rotor core 10 to Brushless DC motor as a motor for a compressor of an air conditioner, the performance of the air conditioner can be increased without the cost increment (the increase of operating efficiency and the decrease of vibration and noise).

Figure 5:
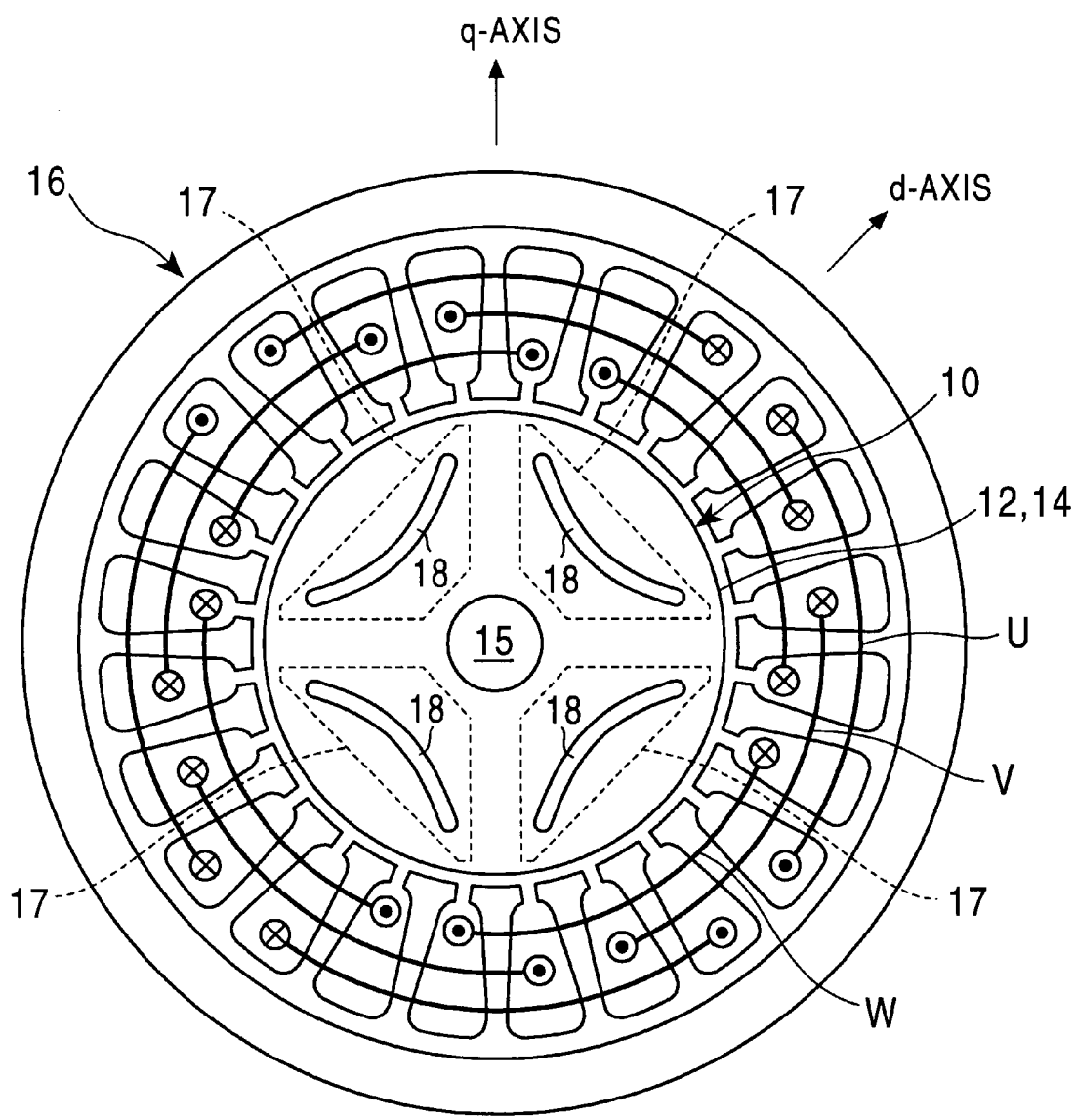
FIG. 5 is a diagrammatic plan view showing the second embodiment according to the present invention.
Figure 6:
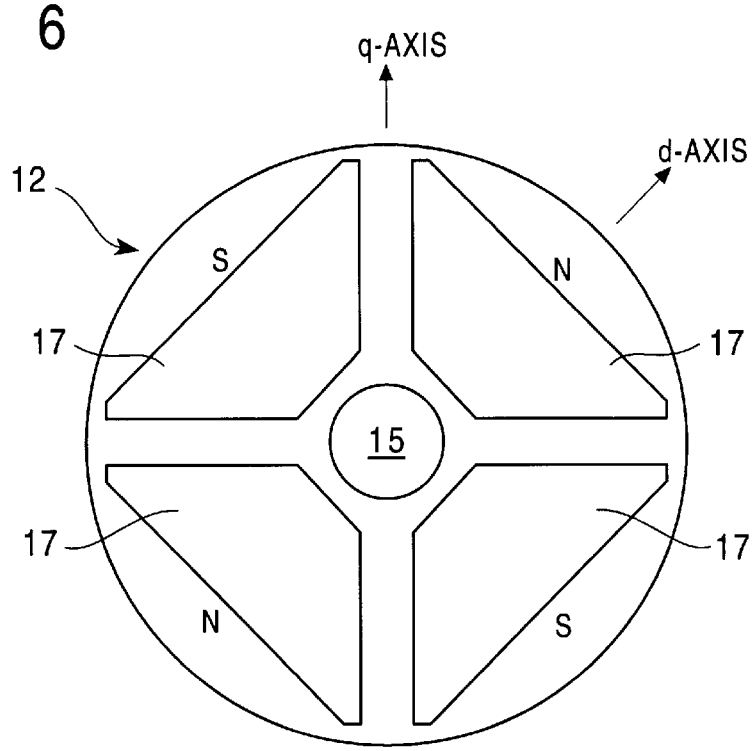
FIG. 6 is a plan view of a first core member constituting the rotor core in the second embodiment.
Figure 7:
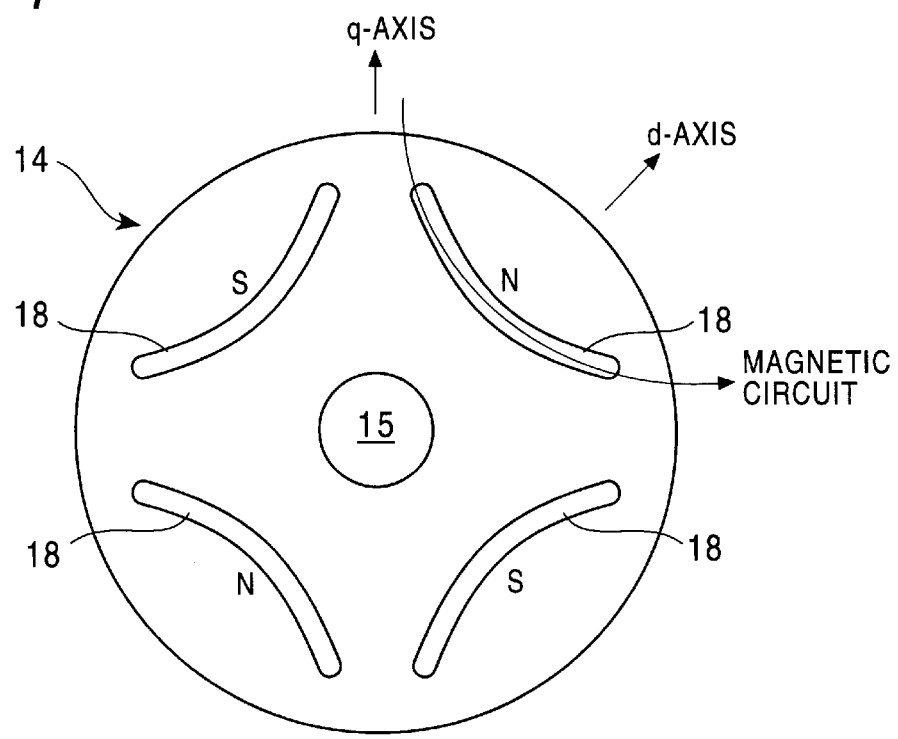
FIG. 7 is a plan view of a second core member constituting the rotor core in the second embodiment.

Next, referring to FIG. 5 to FIG. 7, the second embodiment according to the present invention will be described. In the second embodiment, a rotor core 10 is composed by coaxially uniting the first core member 12 for generating a magnet torque in FIG. 6 and the second core member 14 for generating a reluctance torque in FIG. 7 (refer to FIG. 2).

In the first core member 12, a permanent magnet 17 is embedded per magnetic pole, and in the second embodiment, each permanent magnet 17 is made of, for example, the ferrite magnet having trapezoid cross-section (preferably isosceles trapezoid cross-section), and arranged to orient the long side (the base side) thereof along the outer circumference of the core.

Comparing the permanent magnet 17 of trapezoid cross-section with the permanent magnet 11 of fan-shaped cross-section in the first embodiment, the fabricating cost is high in the case of fan-shaped cross-section because of necessity of the curvilinear process. However, using trapezoid cross-section applied as the second embodiment, the fabricating cost is low since all the sides thereof are configured in rectilinear process. In the second embodiment, the acute areas of the trapezoid cross-section are cut rectilinearly for avoiding chipping.

In the second core member 14, a slit 18 is formed into an arc shape along the magnetic circuit of the magnetic flux from the stator core 16 similar to the first embodiment. As shown in FIG. 5, in the second embodiment, each slit 18 is also formed within the shadow area of the permanent magnet 17 in the first core member 12.

Incidentally, the stator core 16 is the same as that of the first embodiment, so that the description will be omitted.

According to the second embodiment, adding to the effects which are described in the first embodiment, the fabricating cost is low, therefore attaining reducing in cost of the permanent magnet rotor type electric motor.

Figure 8:
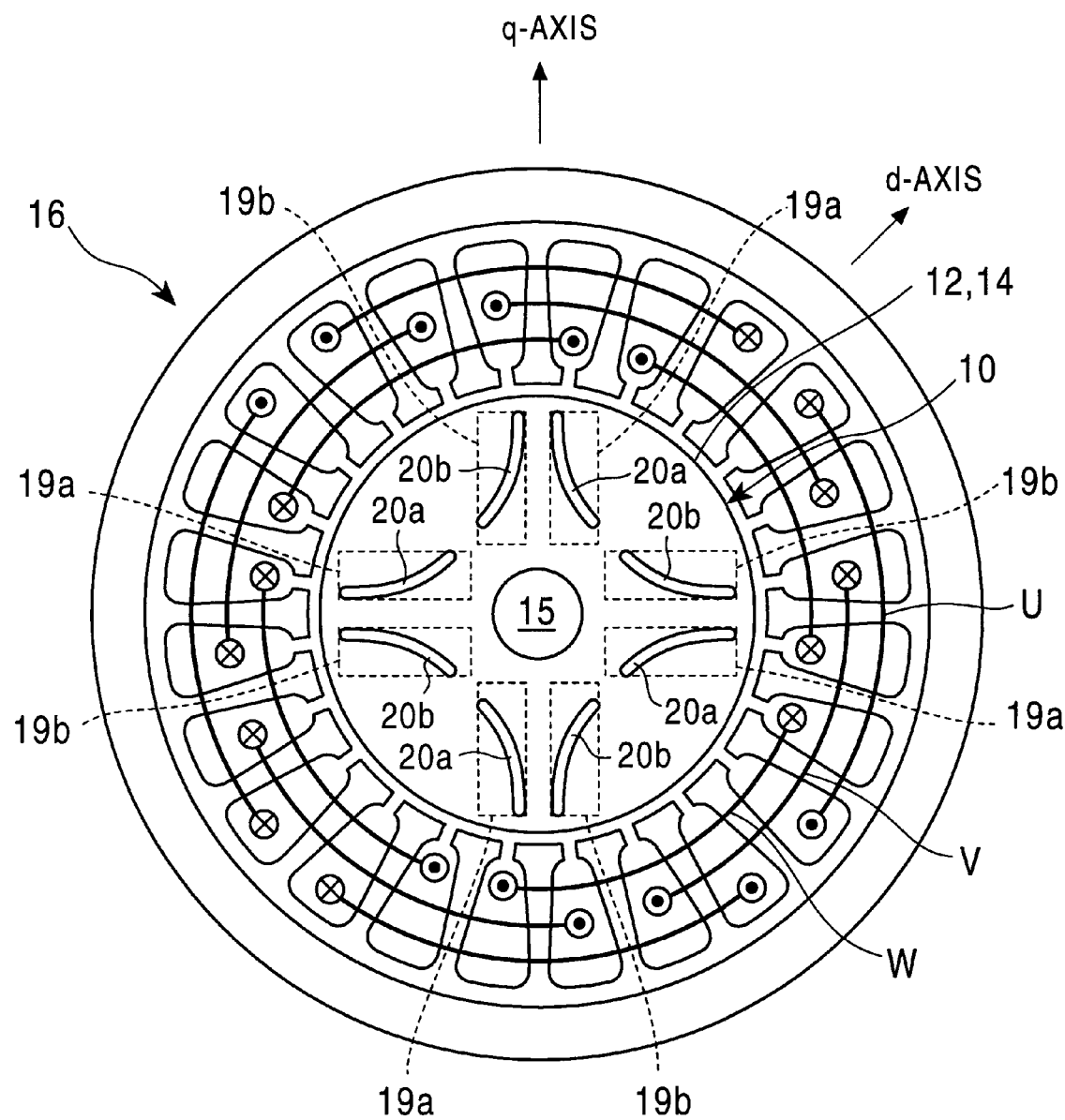
FIG. 8 is a diagrammatic plan view showing the third embodiment according to the present invention.
Figure 9:
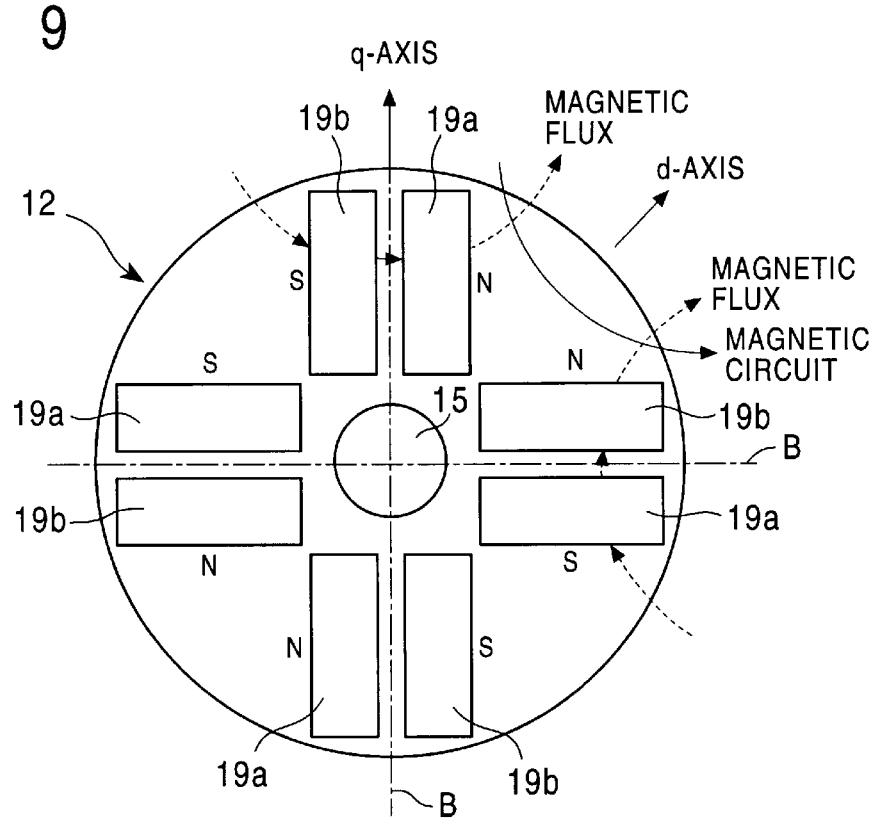
FIG. 9 is a plan view of a first core member constituting the rotor core in the third embodiment.
Figure 10:
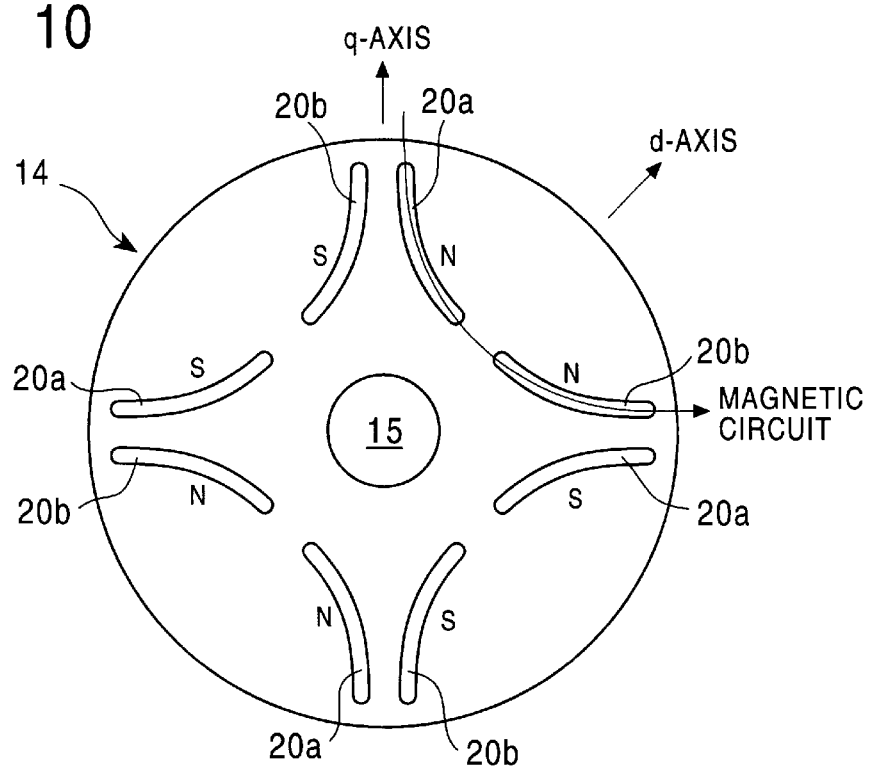
FIG. 10 is a plan view of a second core member constituting the rotor core in the third embodiment.

In FIG. 8 to FIG. 10, the third embodiment of the present invention is shown. In the third embodiment, the rotor core 10 is also composed by coaxially uniting the first core member 12 for generating a magnet torque in FIG. 9 and the second core member 14 for generating a reluctance torque in FIG. 10 (refer to FIG. 2).

In the first core member 12, a permanent magnet is embedded, in this case two permanent magnet pieces 19*a* and 19*b* are used per magnetic pole. Each of the permanent magnet pieces 19*a* and 19*b* is made of a band plate of, for example, the ferrite magnet having rectangular cross-section and is placed along each magnetic-boundary line B.

In other words, there are four poles in this embodiment, so that two boundary lines B perpendicular to each other imaginarily exist between the magnetic poles. In the south pole, permanent magnet pieces 19*a* and 19*b* are arranged to place the respective south pole sides adjacent to each other and to extend perpendicular to each other along the boundary lines B and B. In the north pole, permanent magnet pieces 19*a* and 19*b* are arranged to place the respective north pole sides adjacent to each other) and to extend perpendicular to each other along the boundary lines B and B.

Permanent magnet pieces 19*a* and 19*b* can be formed to have rectangular cross-section and can be fabricated in a rectilinear process, therefore the fabricating cost is low.

Regarding the second core member 14, in the first and second embodiments, the slits 13 and 18 are singularly formed along the magnetic circuit of the magnetic flux from the stator core 16, but in the third embodiment as shown in FIG. 10, the slit is divided into two slits 20a and 20b corresponding to the permanent magnet pieces 19a and 19b in the first core member 12.

As shown in FIG. 8, the slit 20a is placed within the shadow area of the permanent magnet 19a and the slit 20b is placed within the shadow area of the permanent magnet 19b. As described above, the slit is divided into the two slits 20a and 20b, and each slit is formed into an arc shape along the magnetic circuit of the magnetic flux from the stator core 16.

In the third embodiment, adding to the effects of the aforementioned embodiments, the reluctance torque can be further increased in the first core member 12. That is because the two permanent magnets 19a and 19b are placed per magnetic pole along the magnetic-boundary line B not to obstruct the magnetic circuit from the stator core 16 (refer to the solid line in FIG. 9).

Figure 11:
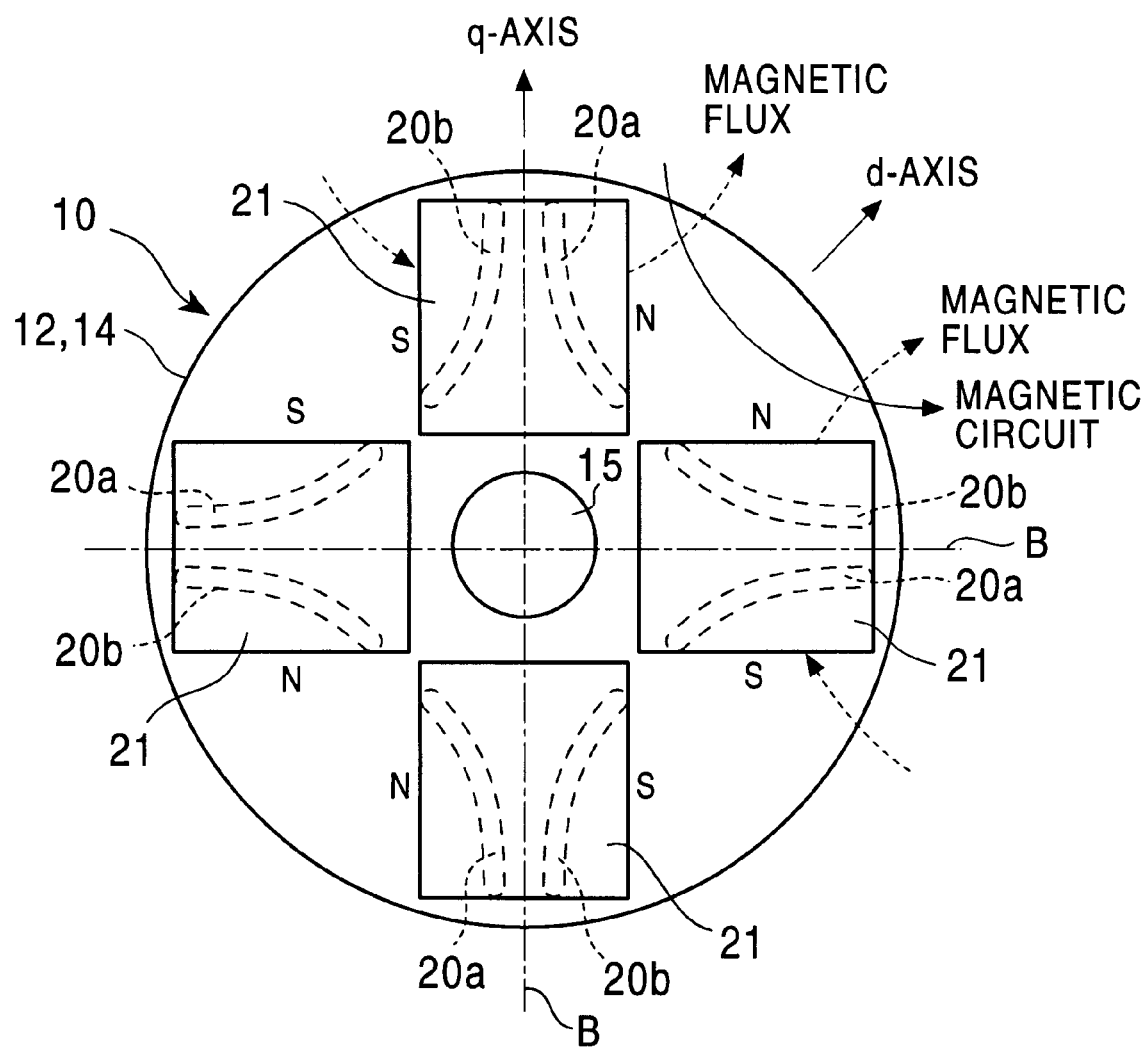
FIG. 11 is a diagrammatic plan view, seen from a side of the first core member of a rotor core, showing the fourth embodiment according to the present invention.

Next, the fourth embodiment shown in FIG. 11 will be described. The fourth embodiment is performed by modifying the permanent magnet in the first core member 12 in the third embodiment, and the structure of the second core member 14 is the same as that in the third embodiment. FIG. 11 is a plan view of the rotor core 10 seen from the first core member 12. Accordingly, the permanent magnet is shown with a solid line and slits 20a and 20b are shown with a chain line, differing from plan views of the rotor core in other embodiments.

In the fourth embodiment, as the permanent magnets embedded in the first core member 12, permanent magnets 21 of which is formed into an integrated shape of the permanent magnets 19a and 19b (refer to FIG. 9) adjacent to each other across magnetic-pole boundary line B are used.

In other words, the permanent magnet 21 is made of, for example, the ferrite magnet being somewhat thick and having rectangular cross-section, and polarized in a direction of the plate thickness. In this embodiment, each of the four permanent magnets 21 is placed to position a center line of the plate thickness on the magnetic-pole boundary line B. Therefore, the single permanent magnet 21 is shared between the adjacent south pole and north pole, and one of the shared portions on the south pole side is applied as a magnetic pole of the south magnetic pole of the rotor core 10 and the other portion on the north pole side is applied as a magnetic pole of the north magnetic pole of the rotor core 10.

Additionally, in the second core member 14, the two slits 20a and 20b are respectively formed corresponding to one half portion on the south pole side and the other half portion on the north pole side of the permanent magnet 21, and formed along the magnetic circuit of the magnetic flux from the stator core 16 (refer to FIG. 10).

According to the fourth embodiment, by the reduction in number of the permanent magnets used comparing to the third embodiment, the fabricating cost can be reduced.

Figure 12:
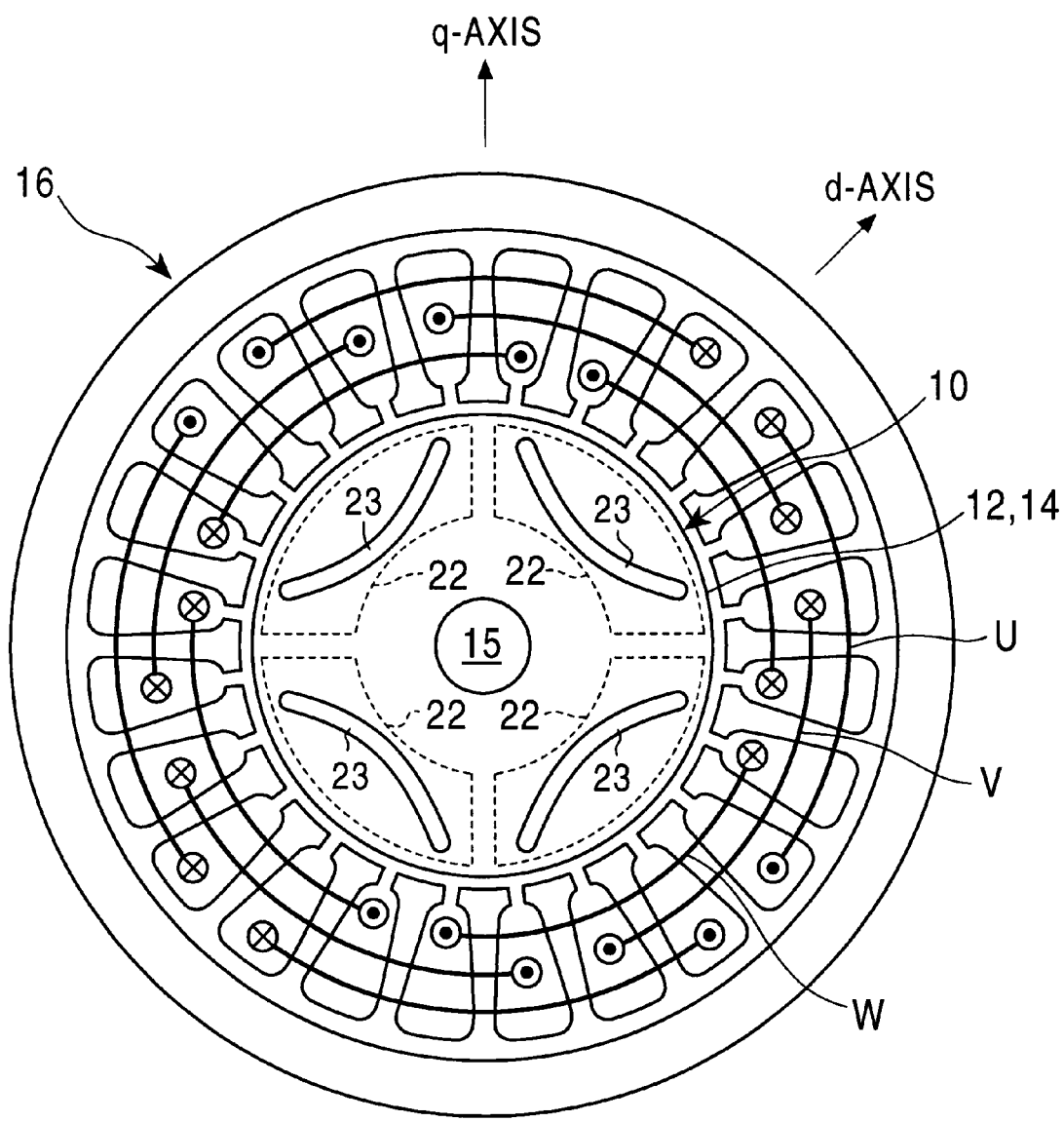
FIG. 12 is a diagrammatic plan view showing the fifth embodiment according to the present invention.
Figure 13:
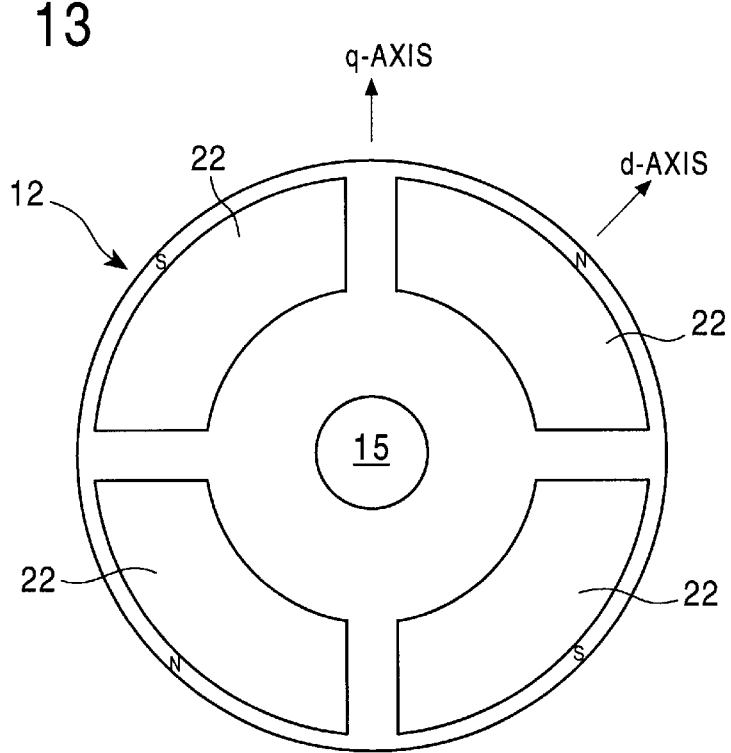
FIG. 13 is a plan view of a first core member constituting the rotor core in the fifth embodiment.

Next, the fifth embodiment of the present invention will be described referring to FIG. 12 to FIG. 14. In the fifth embodiment, the rotor core 10 is composed by coaxially united the first core member 12 for generating a magnet torque in FIG. 13 and the second core member 14 for generating a reluctance torque in FIG. 14. Incidentally, the stator core 16 is the same as that of each aforementioned embodiment, so that the description will be omitted.

In the first core member 12 the permanent magnet is embedded. In this case, the ferrite magnet having arc-shaped cross-section is applied for a permanent magnet 22. The permanent magnet 22 is placed per magnetic pole to orient its convexity toward the outer circumference of the core. In other words, the four permanent magnets 22 are arranged at regular spaced-intervals along the circumferential direction of the first core member 12.

Figure 14:
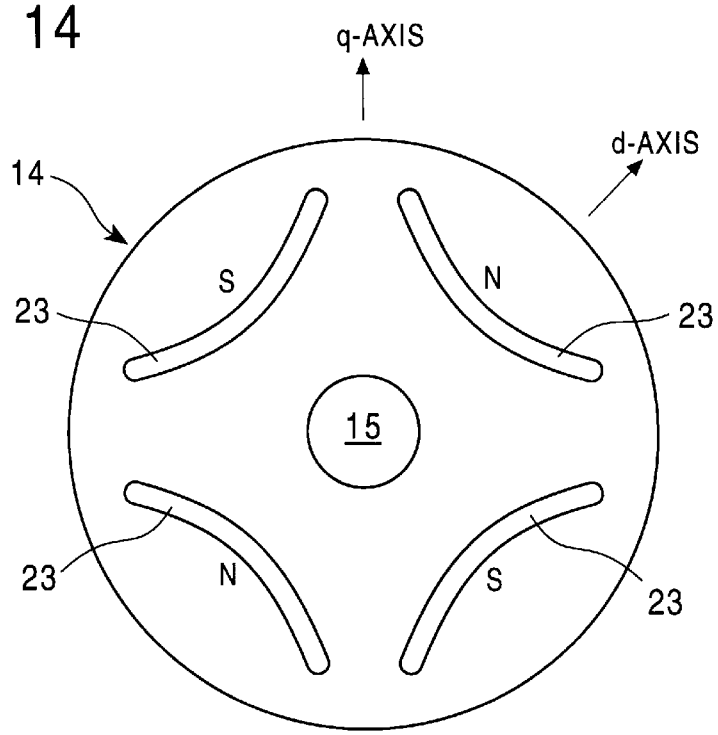
FIG. 14 is a plan view of a second core member constituting the rotor core in the fifth embodiment.

In the second core member 14, as shown in FIG. 14, four slits 23 are each formed into an arc shape corresponding to each permanent magnet 22 and formed along the magnetic circuit of the magnetic flux from the stator core 16.

In this case, the slit 23 is placed to orient its convexity toward the center of the core, which is an inverted-arc in relation with the permanent magnet 22 in the first core member 12. As shown in FIG. 12, the slit 23 is designed not to extend out of the shadow area of the permanent magnet 22.

With the structure of the fifth embodiment, the same effects as these of the embodiments can be obtained, namely, the difference of the inductances between the d-axis and the q-axis (Ld–Lq) is large and the reluctance torque can be increased in the permanent magnet rotor type electric motor.

The typical embodiments according to the present invention have described hereinbefore, but the following various modifications are also included in the scope of the present invention. Note that in the modifications, the stator core 16 does not need to be changed, so that each drawing for the modifications shows only a diagrammatic plan view of the rotor core 10.

Each plan view of the rotor core 10 relating to each modification is a drawing when the rotor core 10 is shown from the second core member 14 side, so that the slit formed in the second core member 14 is represented by a solid line and a short dashed line shows the permanent magnet in the first core member 12 which is located in a position under paper with respect to the second core member 14.

Figure 15:
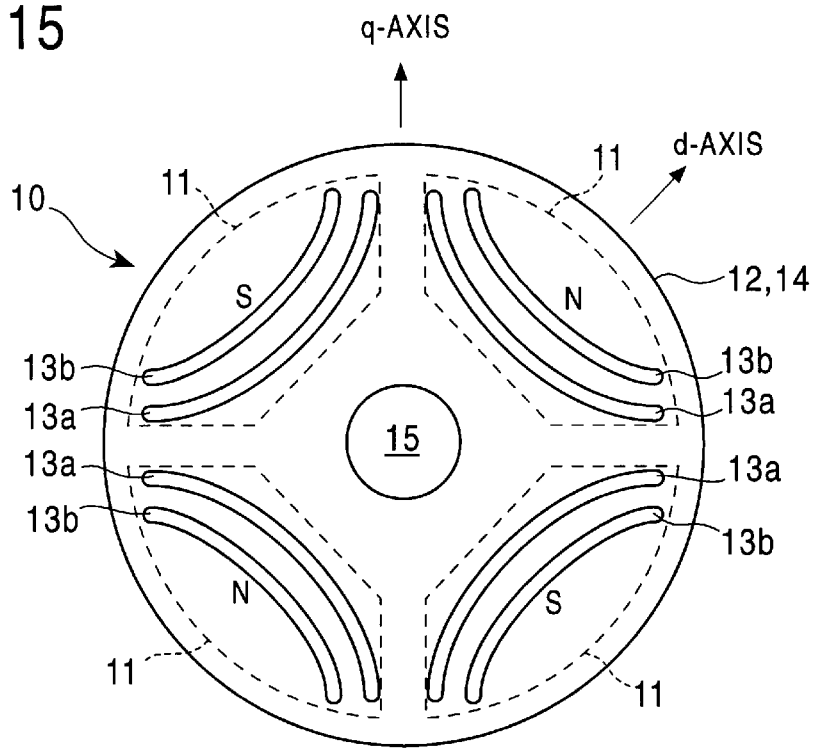
FIGS. 15 to FIG. 22 respectively are plan views, seen from second core members, showing a rotor core as modifications.

The first modification in FIG. 15 is based on the first embodiment, in the first core member 12, the permanent magnet 11 of fan-shaped cross-section is embedded in each magnetic pole to orient its long arc side toward the outer circumference of the core similar to the first embodiment.

On the other hand, in the second core member 14, the two slits 13a and 13b are formed corresponding to each permanent magnet 11. Each slit 13a and 13b is formed into an arc shape along the magnetic circuit of the magnetic flux from the stator core 16. Each slit 13a and 13b is placed parallel to each other and to orient its convexity toward the center of the core, and the range in which the slit is formed is within the shadow area of the permanent magnet 11 similar to the first embodiment.

Figure 16:
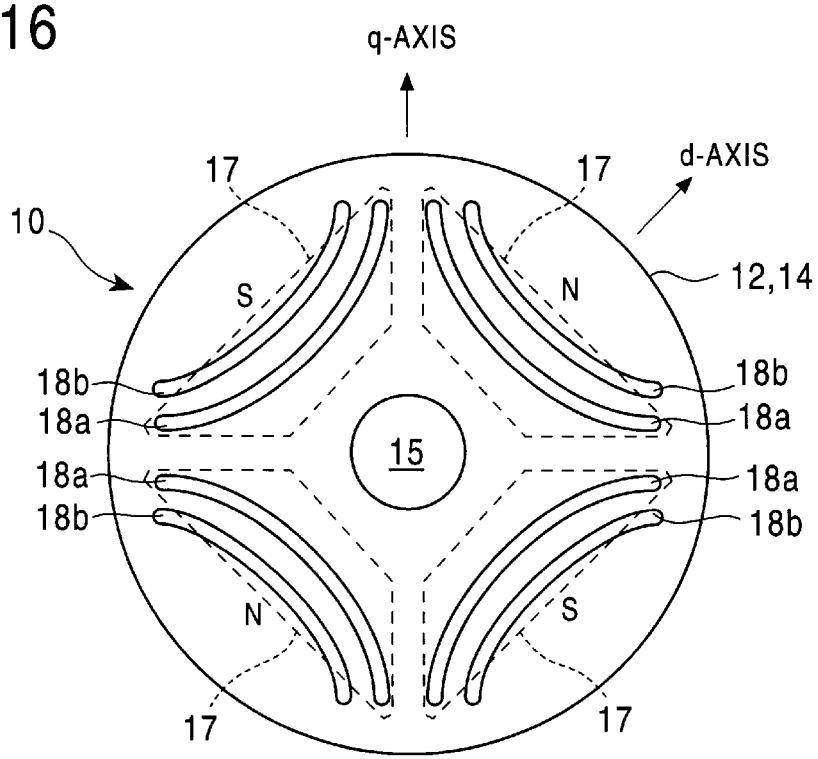

The second modification in FIG. 16 is based on the second embodiment, in the first core member 12, the permanent magnet 17 of trapezoid cross-section is embedded in each magnetic pole to orient its long (the base) side toward the outer circumference of the core similar to the second embodiment.

On the other hand, in the second core member 14, the two slits 18a and 18b are formed corresponding to each permanent magnet 17. Each slit 18a and 18b is formed into an arc shape along the magnetic circuit of the magnetic flux from the stator core 16. Each slit 18a and 18b is arranged parallel to each other and to orient its convexity toward the center of the core. In this example, the slit 18a is entirely formed within the shadow area of the permanent magnet 17, but the slit 18b is formed to extend both ends thereof out of the shadow area of the permanent magnet 17, which is also included in the scope of the present invention.

Figure 17:
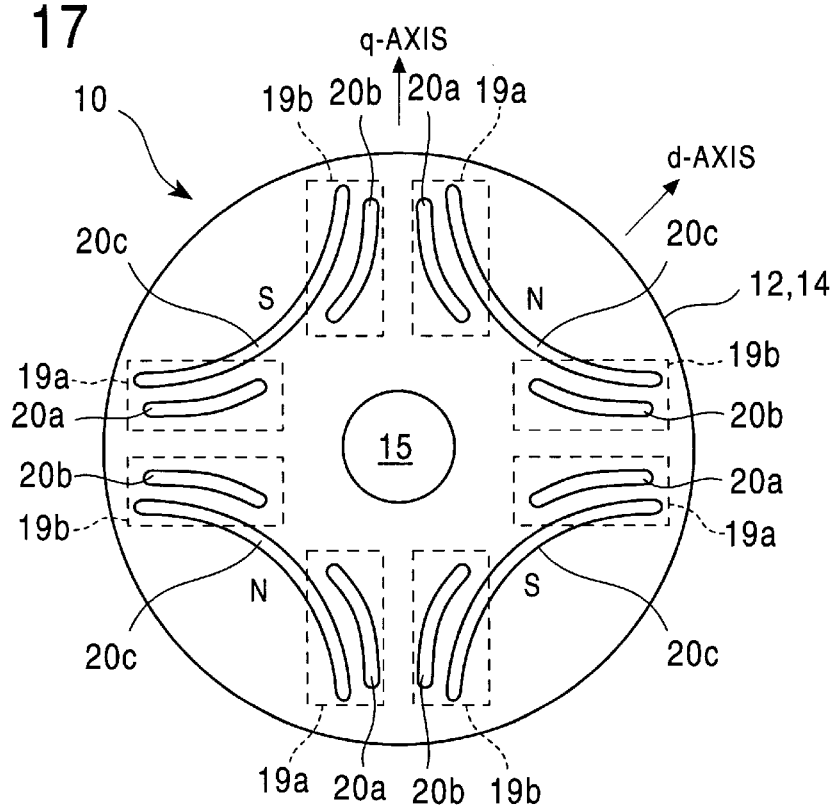

The third modification in FIG. 17 is based on the third embodiment, namely, in the first core member 12, the two permanent magnet pieces 19a and 19b are embedded per magnetic pole.

On the other hand, in a second core member 14, each slit 20a and 20b is formed into an arc shape along the magnetic circuit of the magnetic flux from the stator core 16 within each shadow area of each permanent magnet 19a and 19b, and in this modification a slit 20c is additionally formed.

The slit 20c is provided at a position corresponding to each magnetic pole in the first core member 12. In this case, the slit 20c is formed into a single arc shape along the magnetic circuit of the magnetic flux from the stator core 16 on the outer side of the slits 20a and 20b seen from the center of the core.

In this modification, each slit 20c is formed into a single arc shape from one shadow area of the permanent magnet piece 19a to the other shadow area of the permanent magnet piece 19b, but if necessary, each slit 20c may be formed at a position out of the shadow areas of the permanent magnet pieces 19a and 19b.

Figure 18:
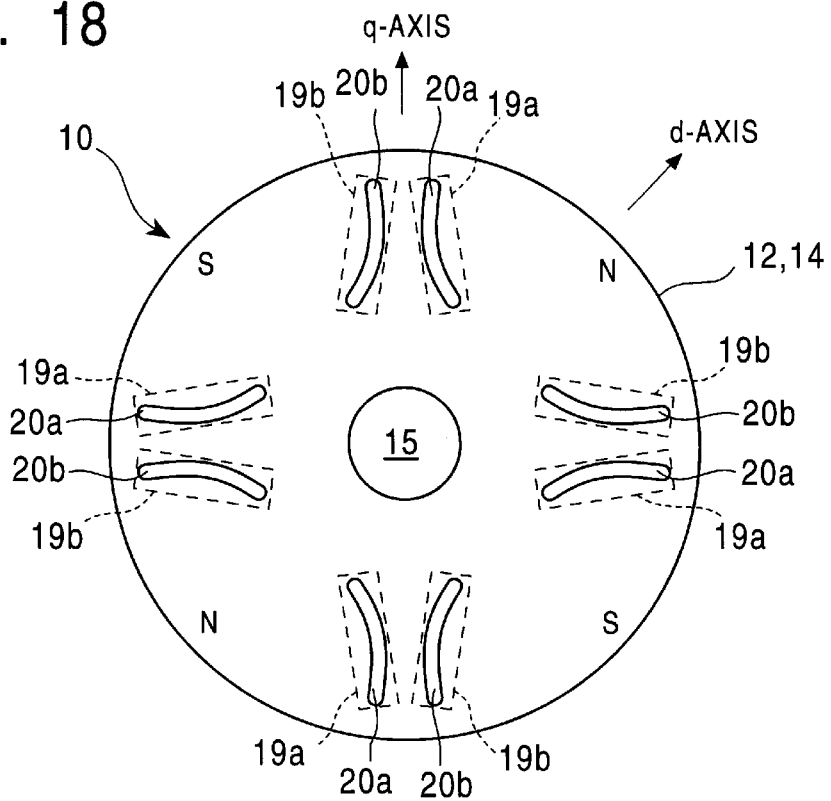

Further, the fourth modification in FIG. 18 is also based on the third embodiment, in this modification, the arrangement of the two permanent magnet pieces 19a and 19b each forming a magnetic pole in the first core member 12 is slightly changed.

More specifically, in the third embodiment, the two permanent magnet pieces 19a and 19b each forming a magnetic pole are placed parallel to the magnetic-pole boundary line B (refer to FIG. 9). As shown in this modification, ends of the permanent magnet pieces 19a and 19b on the core-center side which are assigned to a magnetic pole may be inclined at a predetermined angle to close to each other further than those in the third embodiment. Incidentally, in this fourth modification, the second core member 14 is the same as that in the third embodiment.

Figure 19:
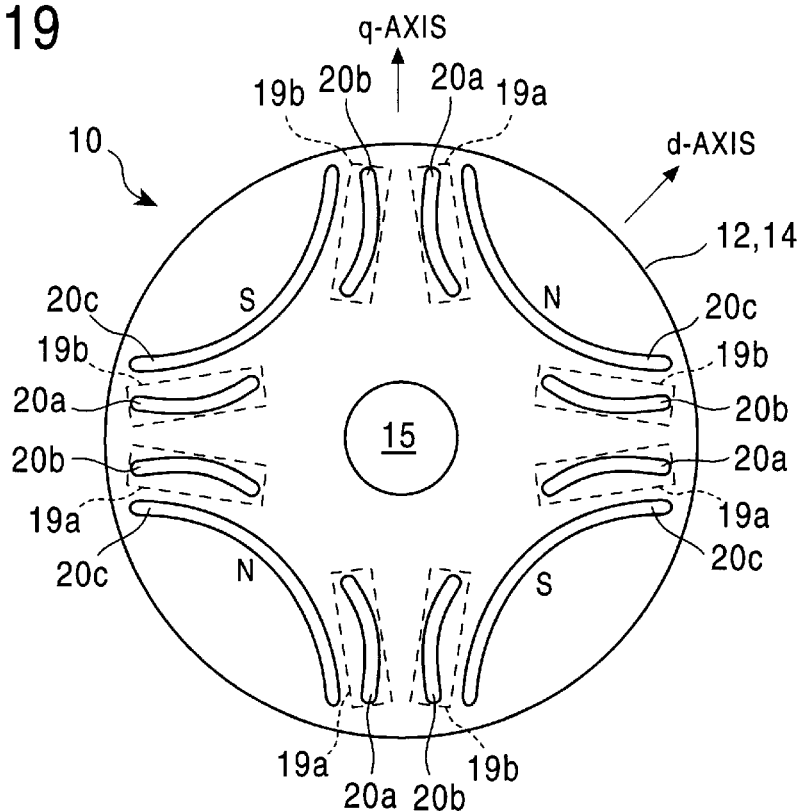

Furthermore, the slit 20c which is described in the modification in FIG. 17 may be added to the fourth modification, which is shown in FIG. 19 as the fifth modification. In this fifth modification, the slit 20c is formed at a position out of each shadow area of the permanent magnet pieces 19a and 19b.

Figure 20:
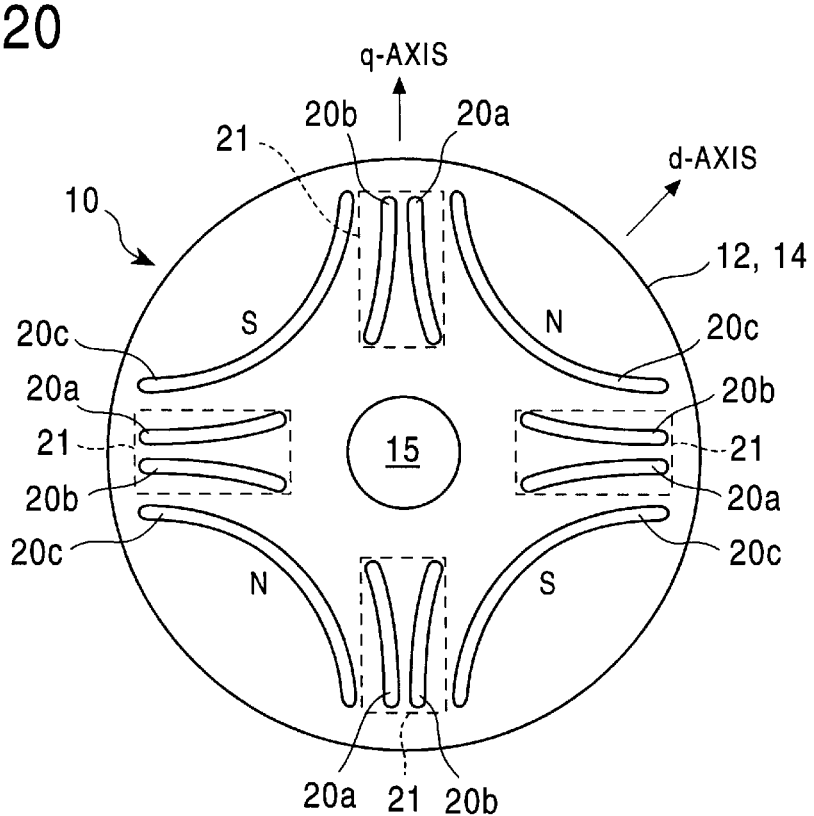

The sixth modification in FIG. 20 is based on the fourth embodiment. More specifically, the structure of the permanent magnet 21 in the first core member 12 is the same as that described in foregoing FIG. 11. In the second core member 14, the two slits 20a and 20b are formed corresponding to one magnetic pole, and in this sixth modification, the slit 20c which is described in the modification of FIG. 17 is additionally formed. Incidentally, in this sixth modification, the slit 20c is also formed at a position out of the shadow of the permanent magnet 21 similar to the fifth modification.

Figure 21:
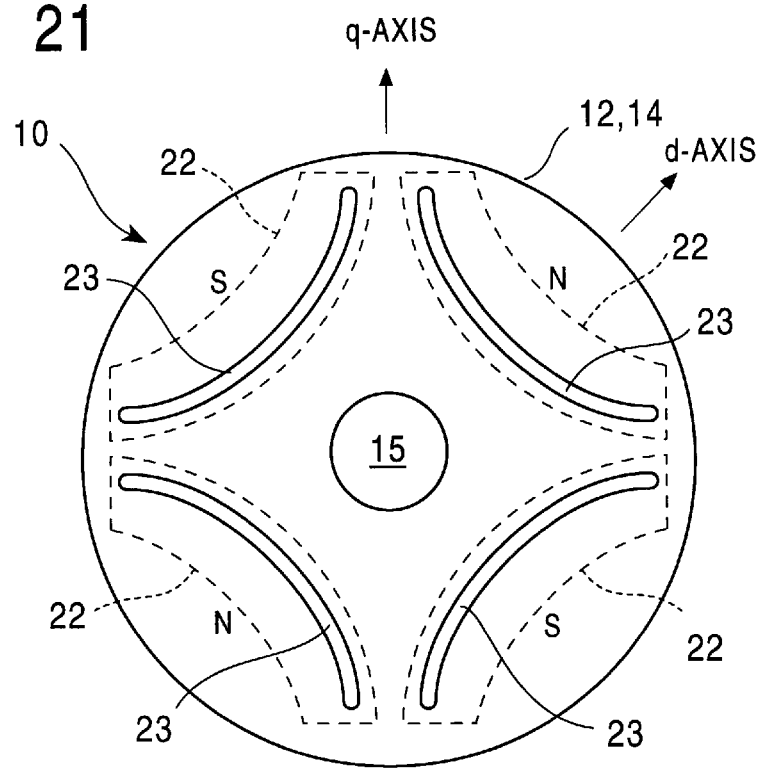
Figure 22:
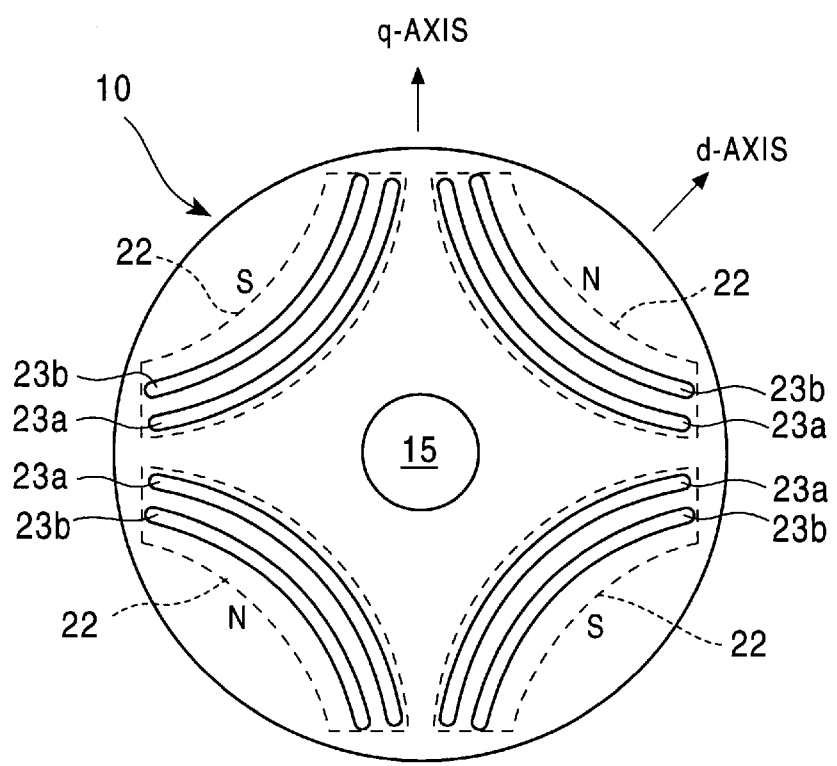
Figure 23:
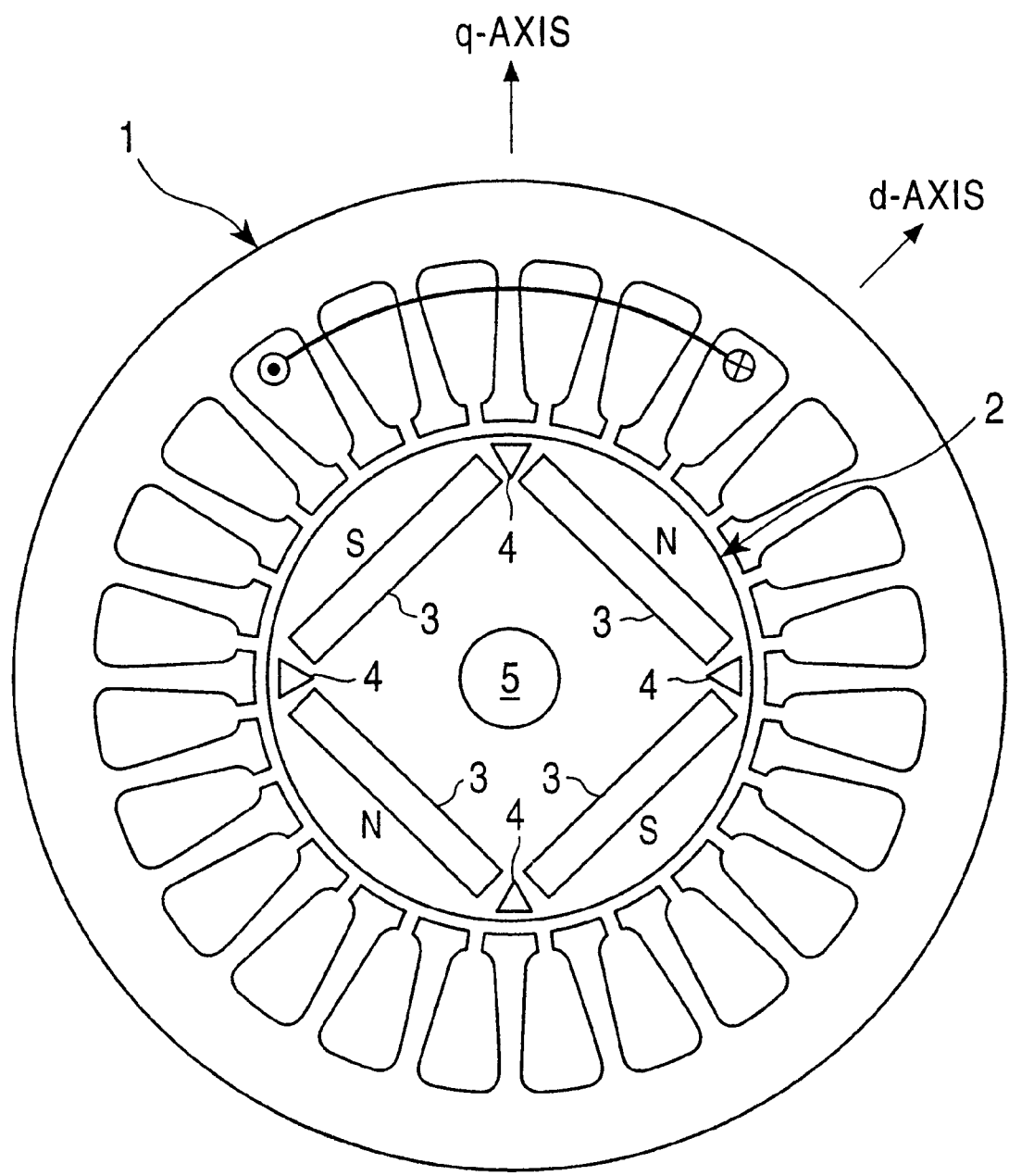
FIG. 23 and FIG. 24 respectively are diagrammatic plan views showing conventional examples.
Figure 24:
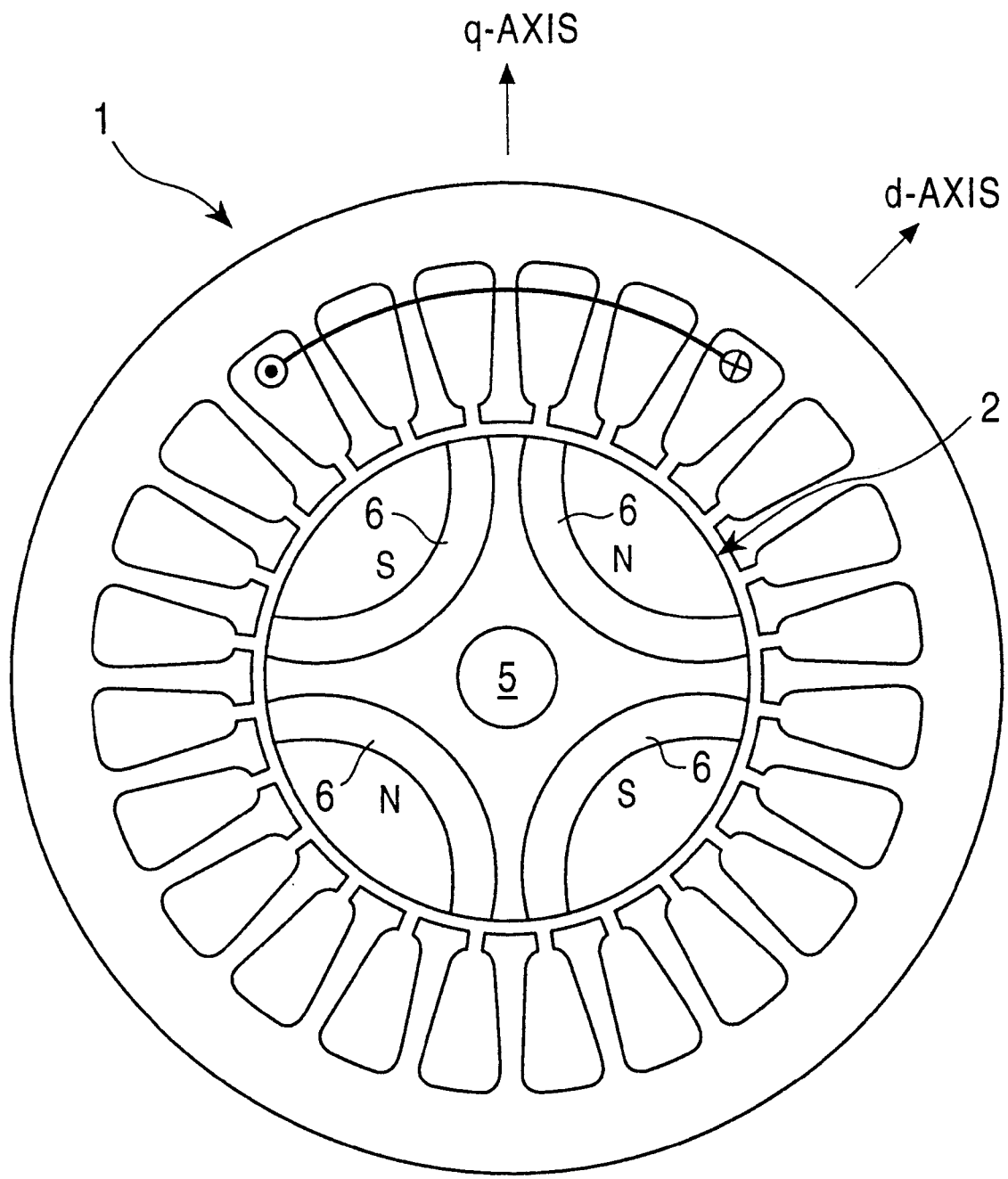

Next, the seventh modification in FIG. 21 will be described. The seventh modification is based on the fifth embodiment. More specifically, in the fifth embodiment, the permanent magnet 22 of the first core member 12 is formed to have arc-shaped cross-section and placed to orient its convexity toward the outer circumference of the core in each magnetic pole. As shown in the seventh modification, each permanent magnet 22 can be placed to orient its convexity toward the center of the core.

Incidentally, in the seventh modification, in the second core member 14, the slit 23 is formed within the shadow area of the permanent magnet 22 similar to the fifth embodiment, alternatively two slits 23a and 23b may be formed parallel to each other within the shadow area of the permanent magnet 22.

Although the present invention has been shown and described with respect to best mode embodiments and modifications thereof, those skilled in the art understanding the subject-matter of the present invention should readily think out other changes, variations, and equivalents thereof, so that the scope of the present invention should be within the scope of the accompanying claims and the equivalencies thereof. For example, in the aforementioned practical description, the number of poles of the permanent magnet rotor type electric motor is four, and even in the case of the different number of poles, the effects of the present invention can be obviously obtained with applying permanent magnets in accordance with the number of poles.

What is claimed is:

1. A permanent magnet rotor type electric motor, comprising:

a stator core generating a rotation magnetic field, and
   a rotor core rotationally situated inside the stator core and composed of a first core member for generating a magnet torque, permanent magnets embedded in the first core member for forming magnetic poles, and a second core member for generating a reluctance torque without having a permanent magnet therein, said second core member being coaxially united with the first core member so that the rotor core is divided into the first core member for generating the magnet torque and the second core member for generating the reluctance torque.

2. A permanent magnet rotor type electric motor, comprising:

a stator core generating a rotation magnetic field, and
   a rotor core rotationally situated inside the stator core and including a first core member and a second core member which are coaxially united with respect to a rotation axis of the rotor core, permanent magnets each having a predetermined cross-section shape and being embedded in said first core member for each magnetic pole, and slits formed in said second core member, each slit extending along a magnetic circuit of a magnetic flux from said stator core and being located at a position facing said each permanent magnet.

3. The permanent magnet rotor type electric motor according to claim 2, wherein said slit is arranged within a shadowy area of cross-section of said permanent magnet.

4. The permanent magnet rotor type electric motor according to claim 2, wherein said permanent magnet in said first core member is formed to have fan-shaped cross-section and placed to orient a long arc side thereof toward an outer circumference of said first core member; and
   wherein said slit in said second core member is formed into an arc shape along the magnetic circuit of the magnetic flux from said stator core within the shadow area of fan-shaped cross-section of said permanent magnet.

5. The permanent magnet rotor type electric motor according to claim 2, wherein said permanent magnet in said first core member is formed to have fan-shape cross-section and placed to orient a long arc side thereof along an outer circumference of said first core member; and
   wherein said second core member is provided therein with a plurality of slits each of which is formed into an arc shape along the magnetic circuit of the magnetic flux from said stator core within the shadow area of fan-shaped cross-section of the permanent magnet.

6. The permanent magnet rotor type electric motor according to claim 2, wherein said permanent magnet in said first core member is formed to have trapezoid cross-section and placed to orient a long side thereof along an outer circumference of said first core member; and wherein said slit in said second core member is formed into an arc shape along the magnetic circuit of the magnetic flux from said stator core within the shadow area of trapezoid cross-section of said permanent magnet.

7. The permanent magnet rotor type electric motor according to claim 2, wherein said permanent magnet in said first core member is formed to have trapezoid cross-section and placed to orient a long side thereof along an outer circumference of said first core member; and wherein said second core member is provided therein with a plurality of slits each of which is formed into an arc shape along the magnetic circuit of the magnetic flux from said stator core, and at least one of said slits is placed to be entirely included within the shadow area of trapezoid cross-section of said permanent magnet.

8. The permanent magnet rotor type electric motor according to claim 2, wherein said permanent magnet in said first core member comprises two magnet pieces of rectangular cross-section which are arranged parallel to a magnetic-pole boundary line; and wherein said second core member is provided therein with two slits each of which is formed into an arc shape along the magnetic circuit of the magnetic flux from said stator core within each shadow area of rectangular cross-section of said two magnet pieces.

9. The permanent magnet rotor type electric motor according to claim 2, wherein said permanent magnet in said first core member comprises two magnet pieces of rectangular cross-section which are arranged parallel to a magnetic-pole boundary line; and wherein said second core member is provided therein with two first slits each of which is formed into an arc shape along the magnetic circuit of the magnetic flux from said stator core within each shadow area of rectangular cross-section of said two magnet pieces, and a second slit which is formed into an arc shape along the magnetic circuit of the magnetic flux from said stator core spreading over shadow areas.

10. The permanent magnet rotor type electric motor according to claim 2, wherein said permanent magnet in said first core member comprises two magnet pieces of rectangular cross-section, and said two magnet pieces are arranged at an angle to decrease in space toward ends of the two magnet pieces which are oriented toward a center of said first core member; and wherein said second core member is provided therein with two slits each of which is formed into an arc shape along the magnetic circuit of the magnetic flux from said stator core within each shadow area of rectangular cross-section of said two magnet pieces.

11. The permanent magnet rotor type electric motor according to claim 2, wherein said permanent magnet in said first core member comprises two magnet pieces of rectangular cross-section, and said two magnet pieces are arranged at an angle to decrease in space toward ends of the two magnet pieces which are oriented toward a center of said first core member; and wherein said second core member is provided therein with two first slits each of which is formed into an arc shape along the magnetic circuit of the magnetic flux from said stator core within each shadow area of rectangular cross-section of said two magnetic pieces, and a second slit which is formed into an arc shape along the magnetic circuit of the magnetic flux from said stator core at an area except each shadow area.

12. The permanent magnet rotor type electric motor according to claim 2, wherein said permanent magnet in said first core member is formed into a plate-shape of rectangular cross-section and polarized in a direction of the plate-thickness, to position a center line of the plate-thickness onto a magnetic-pole boundary line, in which one half portion thereof is used as one magnetic pole of adjacent magnetic poles and the other half portion thereof is used as the other magnetic pole of adjacent magnetic poles; and wherein said second core member is provided therein with two slits each of which is formed into an arc shape along the magnetic circuit of the magnetic flux from said stator core within the shadow area of each pole of said permanent magnet.

13. The permanent magnet rotor type electric motor according to claim 2, wherein said permanent magnet in said first core member is formed into a plate-shape of rectangular cross-section and polarized in a direction of the plate-thickness, to position a center line of the plate-thickness onto said magnetic-pole boundary line, in which one half portion thereof is used as one magnetic pole of adjacent magnetic poles and the other half portion thereof is used as the other magnetic pole of adjacent magnetic poles; and wherein said second core member is provided therein with two first slits each of which is formed into an arc shape along the magnetic circuit of the magnetic flux from said stator core within the shadow area of each magnetic pole of said permanent magnet, and a second slit which is formed into an arc shape along the magnetic circuit of the magnetic flux from said stator core at an area except each shadow area.

14. The permanent magnet rotor type electric motor according to claim 2, wherein said permanent magnet in said first core member is formed to have rectangular cross-section and placed to orient a convexity thereof along a outer circumference of said first core member; and wherein, said slit in said second core member is formed into an arc shape along the magnetic circuit of the magnetic flux from said stator core within the shadow area of arc-shaped cross-section of said permanent magnet.

15. The permanent magnet rotor type electric motor according to claim 2, wherein said permanent magnet in said first core member is formed to have arc-shaped cross-section and placed to orient a convexity thereof toward a center of said first core member; and wherein said slit in said second core member is formed into an arc shape along the magnetic circuit of the magnetic flux from said stator core within the shadow area of arc-shaped cross-section of said permanent magnet.

16. The permanent magnet rotor type electric motor according to claim 2, wherein said permanent magnet in said first core member is formed to have arc-shaped cross-section and placed to orient a convexity thereof toward a center of said first core member; and wherein said second core member is provided therein with a plurality of slits each of which is formed into an arc shape along the magnetic circuit of the magnetic flux from said stator core within the shadow area of arc-shaped cross-section of said permanent magnet.

17. The permanent magnet rotor type electric motor according to claim 2, wherein both said first core member and said second core member comprise laminated bodies of magnetic steel plates which are stamped out by pressing, and in each magnetic steel plate for said first core member a hole for embedding said permanent magnet is stamped out and in each magnetic steel plate for said second core member said slit is stamped out within the shadow area of the hole for embedding said permanent magnet.

18. The permanent magnet rotor type electric motor according to claim 2, wherein said first core member includes the permanent magnets to generate a magnet torque, and said second core member generates a reluctance torque without having a permanent magnet therein.

\* \* \* \* \*